(12) United States Patent
Ito

(10) Patent No.: US 9,552,179 B2
(45) Date of Patent: Jan. 24, 2017

(54) ADJUSTING A PRINT SPEED OF AN IMAGE FORMING APPARATUS BASED ON A COMPARISON OF PRINT COMPLETION TIMES

(71) Applicant: KYOCERA Document Solutions Inc., Osaka (JP)

(72) Inventor: Shigeharu Ito, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 14/978,774

(22) Filed: Dec. 22, 2015

(65) Prior Publication Data

US 2016/0188270 A1    Jun. 30, 2016

(30) Foreign Application Priority Data

Dec. 25, 2014    (JP) .................................. 2014-262515

(51) Int. Cl.
*G06F 3/12*    (2006.01)
*H04N 1/00*    (2006.01)

(52) U.S. Cl.
CPC ............ *G06F 3/1215* (2013.01); *G06F 3/126* (2013.01); *G06F 3/1237* (2013.01); *G06F 3/1285* (2013.01); *H04N 1/00204* (2013.01); *H04N 2201/0094* (2013.01)

(58) Field of Classification Search
CPC .................................................. G06F 3/1215
USPC ....................................................... 358/1.15
See application file for complete search history.

(56) References Cited

U.S. PATENT DOCUMENTS

2007/0253724 A1* 11/2007 Furushige .............. G03G 15/50
399/75

FOREIGN PATENT DOCUMENTS

| JP | 2006102987 A | 4/2006 |
|----|---|---|
| JP | 2006251060 A | 9/2006 |
| JP | 2011-193138 A | 9/2011 |
| JP | 2012245649 A | 12/2012 |
| JP | 2013156513 A | 8/2013 |
| JP | 2013246494 A | 12/2013 |

\* cited by examiner

*Primary Examiner* — Eric A Rust
(74) *Attorney, Agent, or Firm* — IP Business Solutions, LLC

(57) ABSTRACT

An image forming apparatus includes a printing section, an acceptance section configured to accept an instruction for the printing section to change a printing speed, and an operation control section configured to control an operation of the printing section. When the acceptance section accepts the instruction, the operation control section calculates a first amount of time for the printing section to start and complete printing at an unchanged printing speed, a second amount of time for the printing section to start and complete printing at a changed printing speed, and a third amount of time for the printing section to change the printing speed and start printing at the changed printing speed, compares a total of the second and third amounts of time with the first amount of time, and determines whether to allow the printing section to change the printing speed based on a result of the comparison.

11 Claims, 6 Drawing Sheets

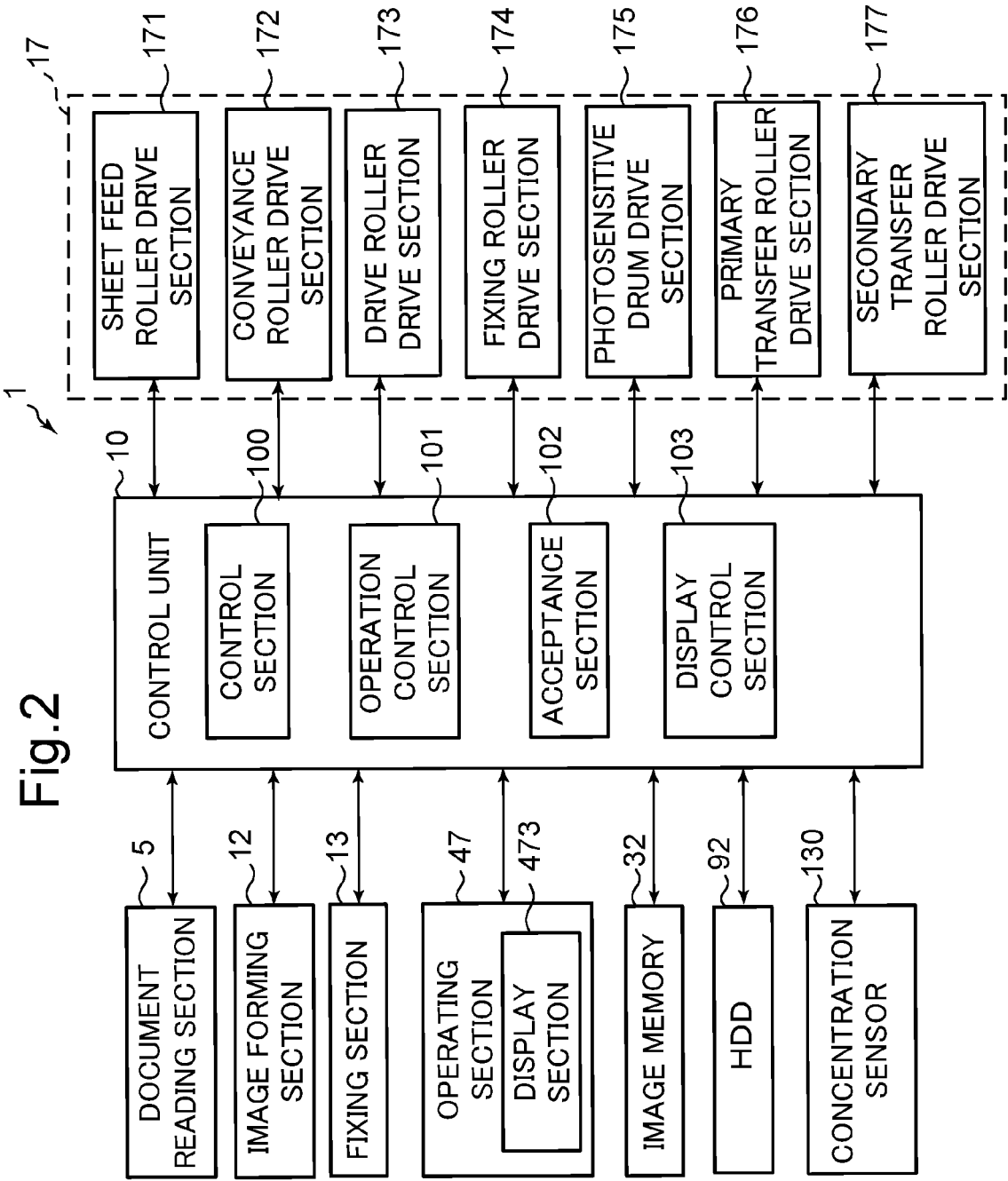

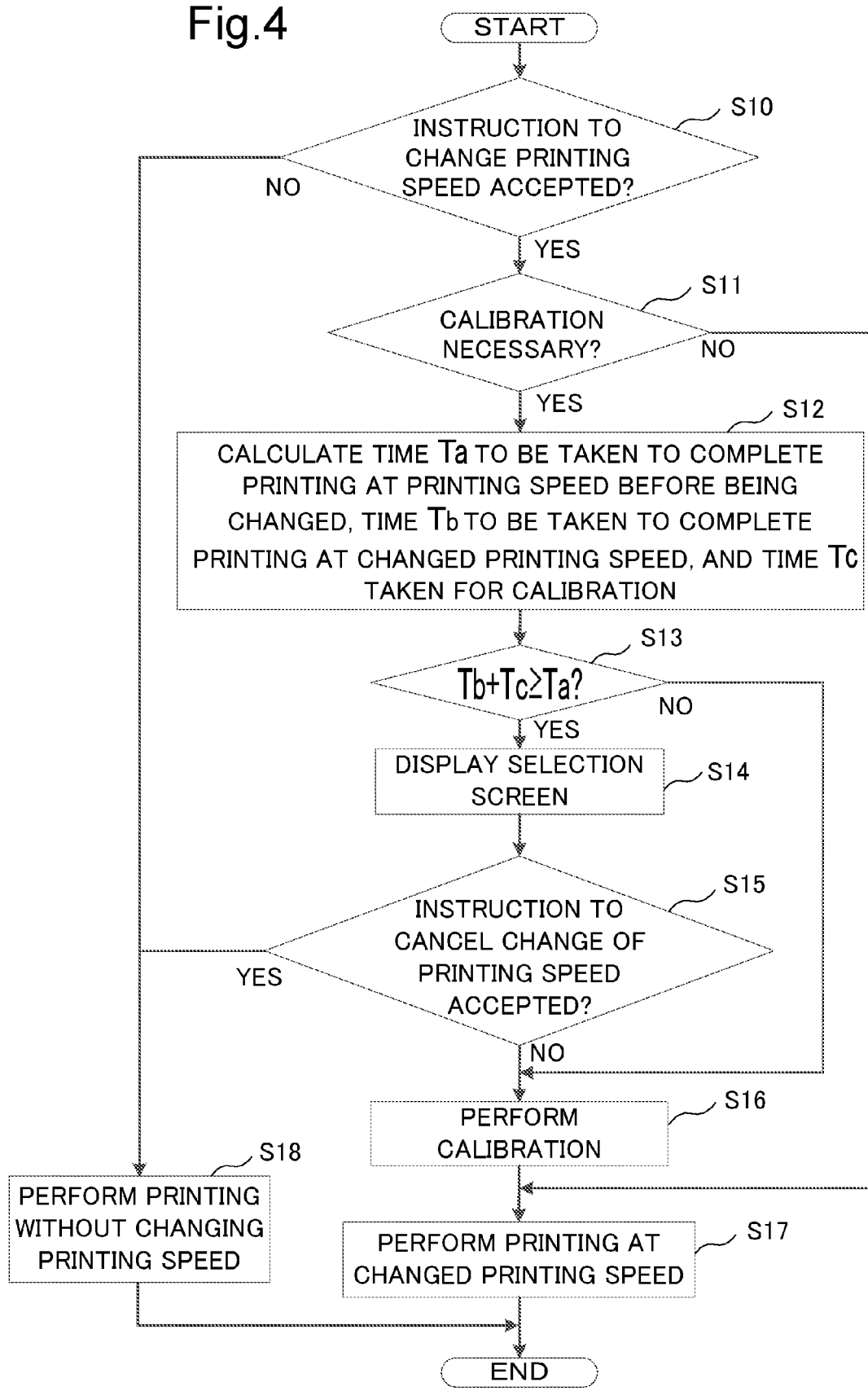

ADJUSTING A PRINT SPEED OF AN IMAGE FORMING APPARATUS BASED ON A COMPARISON OF PRINT COMPLETION TIMES

INCORPORATION BY REFERENCE

This application claims priority to Japanese Patent Application No. 2014-262515 filed on Dec. 25, 2014, the entire disclosure of which is incorporated herein by reference.

BACKGROUND

The present disclosure relates to image forming apparatuses and particularly relates to a technique for changing the printing speed.

Image forming apparatuses capable of changing the printing speed are known. For example, an image forming apparatus is known in which the printing speed is changed based on information contained in an instruction entered by a user. Thus, printing can be performed at a printing speed desired by the user.

SUMMARY

A technique improved over the aforementioned technique is proposed as one aspect of the present disclosure.

An image forming apparatus according to an aspect of the present disclosure includes a printing section and a control unit. The control unit implements an acceptance section and an operation control section.

The acceptance section is configured to accept an instruction for the printing section to change a printing speed.

The operation control section is configured to control an operation of the printing section, wherein when the acceptance section accepts the instruction to change the printing speed, the operation control section calculates a first amount of time to be taken from when the printing section starts printing at a printing speed before being changed until the printing section completes the printing, a second amount of time to be taken from when the printing section starts the printing at a changed printing speed until the printing section completes the printing, and a third amount of time to be taken for the printing section to change the printing speed and start the printing at the changed printing speed, compares a total amount of time of the second and third amounts of time with the first amount of time, and determines whether to allow the printing section to change the printing speed based on a result of the comparison.

BRIEF DESCRIPTION OF THE DRAWINGS

FIG. 2 is a block diagram schematically showing an essential internal configuration of the image forming apparatus according to the one embodiment of the present disclosure.

FIG. 4 is a flowchart showing an operation flow of the image forming apparatus according to the one embodiment of the present disclosure.

DETAILED DESCRIPTION

Hereinafter, a description will be given of an image forming apparatus according to one embodiment of the present disclosure with reference to the drawings.

Figure 1:
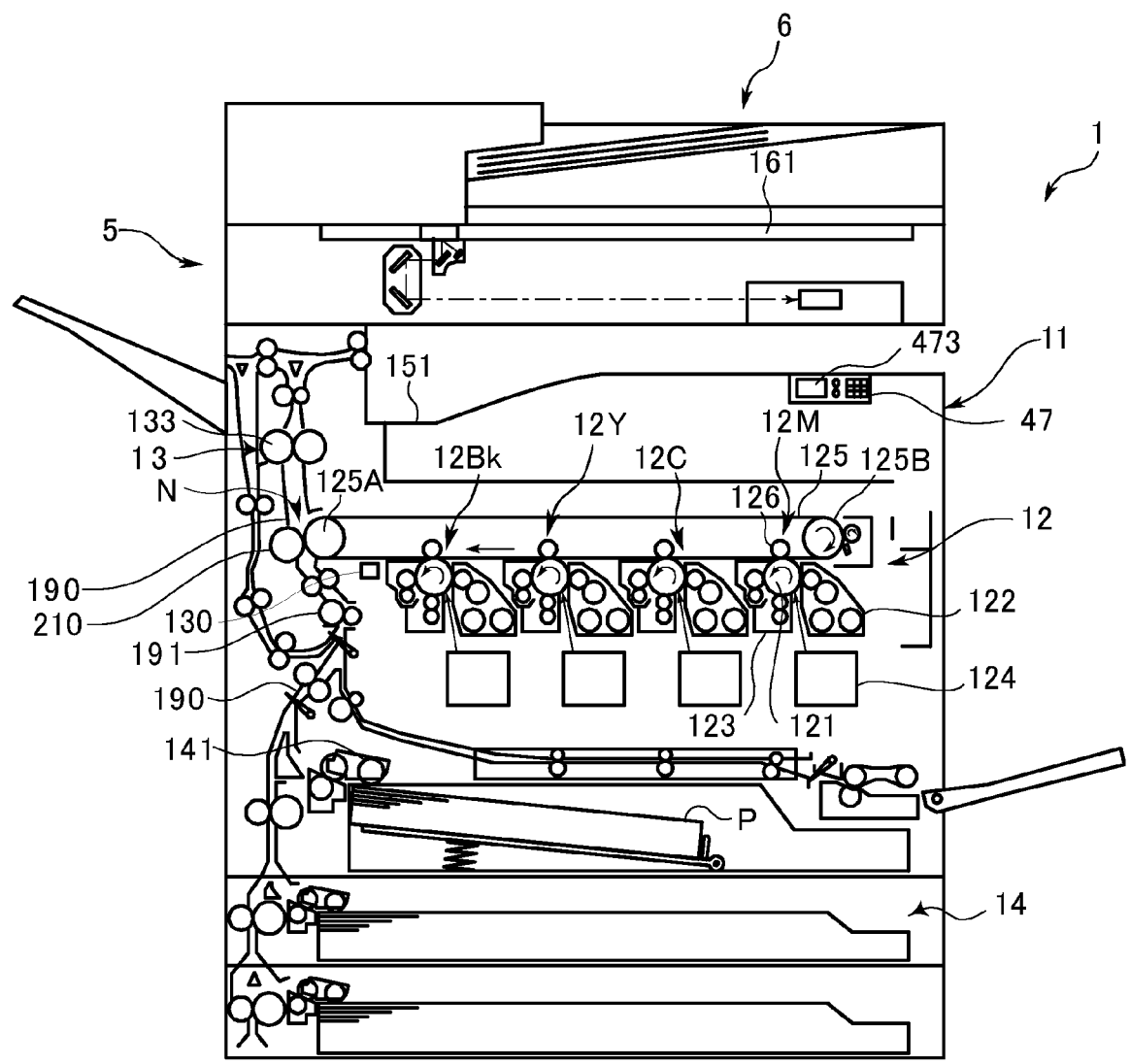
FIG. 1 is a front cross-sectional view showing the structure of an image forming apparatus according to one embodiment of the present disclosure.

FIG. 1 is a front cross-sectional view showing the structure of an image forming apparatus according to one embodiment of the present disclosure.

The image forming apparatus 1 is a multifunction peripheral having multiple functions including, for example, a copy function, a print function, a scan function, and a facsimile function. The image forming apparatus 1 is made up so that an apparatus body 11 thereof includes an operating section 47, an image forming section 12, a fixing section 13, a sheet feed section 14, a document feed section 6, a document reading section 5, and so on.

In a document reading operation of the image forming apparatus 1, the document reading section 5 optically reads an image of an original document being fed by the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section 12 forms a toner image on a recording paper sheet P serving as a recording medium fed from the sheet feed section 14 by a sheet feed roller 141, based on image data generated by the document reading operation, image data stored on the internal HDD, or other image data. Each of image forming units 12M, 12C, 12Y, and 12Bk of the image forming section 12 includes a photosensitive drum 121, a charging device 123, an exposure device 124, a developing device 122, and a primary transfer roller 126.

Each of the developing devices 122 of image forming units 12M, 12C, 12Y, and 12Bk holds a toner for use in developing an electrostatic latent image. The developing device 122 is configured to supply the toner to the surface of the photosensitive drum 121 which has been charged by the charging device 123 and exposed to light by the exposure device 124.

In performing color printing, the image forming unit 12M for magenta, the image forming unit 12C for cyan, the image forming unit 12Y for yellow, and the image forming unit 12Bk for black in the image forming section 12 form respective toner images on their respective photosensitive drums 121 through charging, exposure, and developing processes based on respective images of respective different color components constituting the image data and then allow their respective primary transfer rollers 126 to transfer the toner images to an intermediate transfer belt 125 mounted around a drive roller 125A and a driven roller 125B.

The intermediate transfer belt 125 has an outer peripheral surface set as an image carrying surface to which a toner image is to be transferred, and is configured to be driven by the drive roller 125A while engaging against the peripheral surfaces of the photosensitive drums 121. The intermediate transfer belt 125 is configured to travel in an endless path between the drive roller 125A and the driven roller 125B while synchronizing with each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 is configured to transfer the multicolor toner image formed on the surface of the intermediate transfer belt 125, at a nip N between the secondary transfer roller 210 and the drive roller 125A with the intermediate transfer belt 125 in between, to a recording paper sheet P conveyed from the sheet feed section 14 along a conveyance path 190 by conveyance roller pairs 191 provided at appropriate locations in the conveyance path 190. Thereafter, the fixing section 13 fixes the toner image on the recording paper sheet P by the application of heat and pressure using a fixing roller unit 133 including a heat roller and a pressure roller. The recording paper sheet P having a multicolor image fixed thereon by the completion of the fixation treatment is discharged to a sheet output tray 151.

Next, a description will be given of an electrical configuration of the image forming apparatus 1. FIG. 2 is a functional block diagram schematically showing an essential internal configuration of the image forming apparatus 1.

The image forming apparatus 1 includes, in addition to the previously described document reading section 5, image forming section 12, fixing section 13, and so on, an operating section 47, an image memory 32, an HDD (hard disk drive) 92, a control unit 10, a drive unit 17, and so on.

The operating section 47 includes a touch panel section and an operating key section which are configured to accept user's instructions for various types of operations and processing executable by the image forming apparatus 1. The touch panel section is made up by including a display section 473, such as an LCD (liquid crystal display) equipped with a touch panel.

The image memory 32 provides a region for temporarily storing data of image of an original document read by the document reading section 5 and temporarily storing data to be printed by the image forming section 12.

The HDD 92 is a large storage device capable of storing document images and so on read by the document reading section 5.

The control unit 10 is composed of a processor, a CPU (central processing unit), a RAM (random access memory), a ROM (read only memory), and so on. An image forming apparatus control program stored in the aforementioned ROM of the control unit 10 or the HDD 92 is executed by the aforementioned CPU, so that the control unit 10 functions as a control section 100, an operation control section 101, an acceptance section 102, and a display control section 103. Alternatively, each of the control section 100, the operation control section 101, the acceptance section 102, and the display control section 103 of the control unit 10 may not be implemented by the operation of the control unit 10 in accordance with the image forming apparatus control program but may be constituted by a hardware circuit.

The control section 100 governs the overall control of the image forming apparatus 1.

The display control section 103 has the function of controlling the display operation of the display section 473 and is thus configured to allow the display section 473 to display a predetermined operating screen and so on.

The acceptance section 102 has the function of accepting, based on a user's operation entered using the touch panel section or the operating key section of the operating section 47 according to the operating screen or so on displayed on the display section 473, jobs and so on relating to processing executable on the image forming apparatus 1.

The operation control section 101 is connected to a printing section which includes the image forming section 12, the fixing section 13, and the drive unit 17 composed of a plurality of drive sections 171 to 177 each including a stepping motor, a gear, and so on. The operation control section 101 has the function of controlling the printing operation of the printing section.

The printing section is configured to be capable of changing the printing speed under the control of the operation control section 101. When the acceptance section 102 accepts an instruction to change the printing speed, the operation control section 101 changes the printing speed by allowing the printing section to change its processing speed in the printing operation. Specifically, the operation control section 101 allows the printing section to change the processing speed in the printing operation by controlling a photosensitive drum drive section 175 to change the peripheral speed of the photosensitive drum 121 or controlling the conveyance roller drive section 172 to change the speed of conveyance of the recording paper sheet P.

Alternatively, the operation control section 101 may change the printing speed not by changing the processing speed in the printing operation but by controlling a sheet feed roller drive section 171, the conveyance roller drive section 172 or so on to allow the printing section to change the interval between recording paper sheets P being fed in a continuous printing operation.

Furthermore, the operation control section 101 is configured to perform, with some predetermined condition as a trigger, processing for correcting the printing conditions of the printing section (calibration). An example of such condition serving as a trigger to perform the calibration is that the printing section changes the printing speed. The reason for this is that when the printing speed is changed, the development condition and so on change, which may cause a concentration change, a color registration error or so on of the image. The operation control section 101 reduces the concentration change, the color registration error or so on of the image by correcting the printing conditions, such as the intensity of light to be applied to the photosensitive drum 121, the charging potential of the photosensitive drum 121, the developing bias, and the supply of toner before the printing section changes the printing speed and performs a printing operation.

In the calibration, the operation control section 101 allows the printing section to form a test image on the intermediate transfer belt 125 under the same conditions as in the normal printing operation. A concentration sensor 130 is disposed facing the peripheral surface of the intermediate transfer belt 125 (see FIG. 1). The concentration sensor 130 applies light to the test image formed on the intermediate transfer belt 125 and receives reflected light from the intermediate transfer belt 125 having reflected the applied light. The concentration sensor 130 outputs a signal corresponding to the light intensity of the reflected light. The operation control section 101 detects the concentration and position of the test image based on the signal output from the concentration sensor 130. Then, the operation control section 101 corrects, based on information on the detected concentration and position of the test image, the printing conditions, such as the intensity of light to be applied to the photosensitive drum 121, the charging potential of the photosensitive drum 121, the developing bias, and the supply of toner. Furthermore, the operation control section 101 stores the corrected printing conditions in a region of the HDD 92 inaccessible by general users.

As seen from the above, in order to ensure the printing quality, calibration needs to be done before a printing operation is performed at a changed printing speed. Therefore, the printing section cannot perform printing at the changed printing speed as soon as the acceptance section 102 accepts an instruction to change the printing speed, that is, a certain amount of time is required for the printing section to change the printing speed and start a printing operation at the changed printing speed.

Figure 3A:
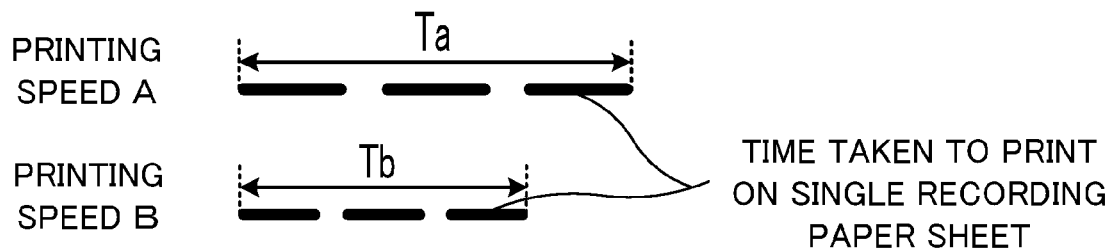
FIGS. 3A, 3B, and 3C are diagrams showing examples of amounts of time taken to complete printing.
Figure 3B:
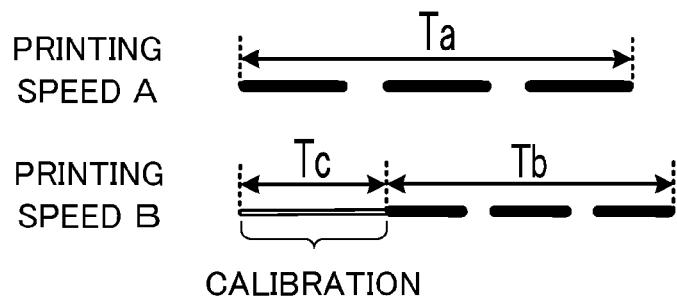
Figure 3C:
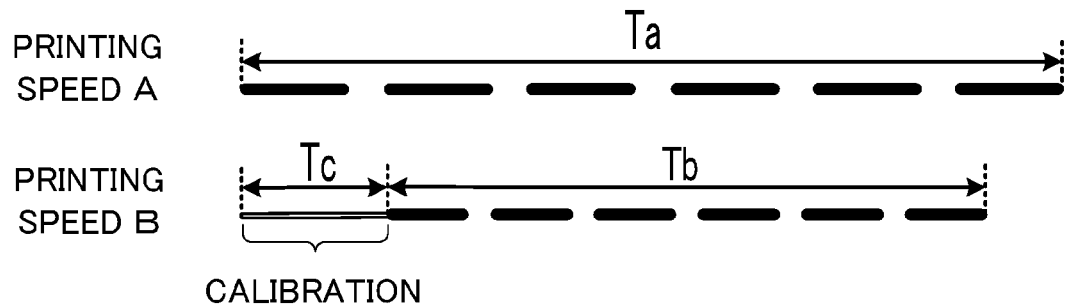

FIGS. 3A to 3C are diagrams showing examples of amounts of time taken to complete printing at a printing speed A and a printing speed B. In these figures, the printing speed B shows a printing speed higher than the printing speed A.

FIG. 3A shows examples of amounts of time taken to complete printing on three recording paper sheets P. Since the printing speed B is higher than the printing speed A, the amount of time taken to print on a single recording paper sheet P at the printing speed B is shorter than at the printing speed A. As a result, the amount of time Tb taken to complete printing at the printing speed B is also shorter than the amount of time Ta taken to complete printing at the printing speed A. However, in performing a printing operation after the change from the printing speed A to the printing speed B, calibration needs to be done prior to the printing operation. In printing on a small number of recording paper sheets P, the amount of time Tc taken for calibration may be longer than the amount of time Ta−Tb shortened by the change from the printing speed A to the printing speed B. In this case, as shown in FIG. 3B, the amount of time Tb+Tc taken from the change from the printing speed A to the printing speed B to the completion of printing at the printing speed B is longer than the amount of time Ta taken to complete printing at the printing speed A.

On the other hand, in printing on a large number of recording paper sheets P, the amount of time Ta−Tb shortened by the change from the printing speed A to the printing speed B is longer than the amount of time Tc taken for calibration. In this case, as shown in FIG. 3C, the amount of time Tb+Tc taken from the change from the printing speed A to the printing speed B to the completion of printing at the printing speed B is shorter than the amount of time Ta taken to complete printing at the printing speed A.

As described above, when the printing speed is changed, the amount of time taken to complete printing may be longer than when the printing speed is not changed.

The inventor conducted intensive studies and thus devised the configuration of this image forming apparatus 1 based on the above idea. In this image forming apparatus 1, when the acceptance section 102 accepts an instruction to change the printing speed, the operation control section 101 calculates the amount of time Ta (first amount of time) to be taken from when the printing section starts printing at a printing speed before being changed until the printing section completes the printing, the amount of time Tb (second amount of time) to be taken from when the printing section starts the printing at a changed printing speed until the printing section completes the printing, and the amount of time Tc (third amount of time) to be taken for the printing section to change the printing speed and start the printing at the changed printing speed. In this relation, the operation control section 101 calculates the amount of time to be taken for calibration necessary for the printing section to change the printing speed and perform a printing operation at the changed printing speed as the amount of time Tc to be taken for the printing section to change the printing speed and start the printing operation at the changed printing speed. Then, the operation control section 101 compares the total amount of time Tb+Tc of the amount of time Tb and the amount of time Tc with the amount of time Ta and determines, based on the comparison result, whether to allow the printing section to change the printing speed.

FIG. 4 is a flowchart showing an operation flow of the image forming apparatus 1 according to the one embodiment of the present disclosure. When the acceptance section 102 accepts an instruction to change the printing speed (YES in step S10), the operation control section 101 determines whether or not calibration is necessary in changing the printing speed (step S11). If the printing speed indicated in the instruction accepted by the acceptance section 102 in the processing in step S10 is not so different from the current printing speed, a concentration change or a color registration error of an image is less likely to occur. Therefore, a certain degree of printing quality can be ensured even if no calibration is done. In view of this, if the difference between the printing speed indicated in the instruction and the current printing speed is equal to or more than a predetermined threshold value, the operation control section 101 determines that calibration is necessary. On the other hand, if the difference between the printing speed indicated in the instruction and the current printing speed is less than the predetermined threshold value, the operation control section 101 determines that calibration is not necessary.

If calibration is not necessary (NO in step S11), the operation control section 101 changes the printing speed and allows the printing section to perform an printing operation at the changed printing speed (step S17).

On the other hand, if calibration is necessary (YES in step S11), the operation control section 101 calculates the amounts of time Ta, Tb, and Tc (step S12). In doing so, if the numbers of sheets that can be printed per unit time (PPM (page per minute)) are already known as the printing speeds, the operation control section 101 calculates each of the amounts of time Ta and Tb by dividing the number of recording paper sheets subject to printing indicated in a print job accepted by the acceptance section 102 by the associated number of sheets that can be printed per unit time (the printing speed). Alternatively, if the speeds of conveyance of recording paper sheets are already known as the printing speeds, the operation control section 101 multiplies the number of recording paper sheets subject to printing indicated in the print job accepted by the acceptance section 102 by the sum of the dimension of the recording paper sheet in the direction of conveyance thereof and the distance between the adjacent recording paper sheets. Then, the operation control section 101 calculates each of the amounts of time Ta and Tb by dividing the value obtained by the multiplication by the associated speed of conveyance of recording paper sheets (the printing speed). The HDD 92 or the like previously stores information indicating the amount of time to be taken for calibration. The operation control section 101 calculates the amount of time Tc by retrieving the information.

After the processing in step S12, the operation control section 101 compares the total amount of time Tb+Tc of the amount of time Tb and the amount of time Tc with the amount of time Ta (step S13).

Figure 5:
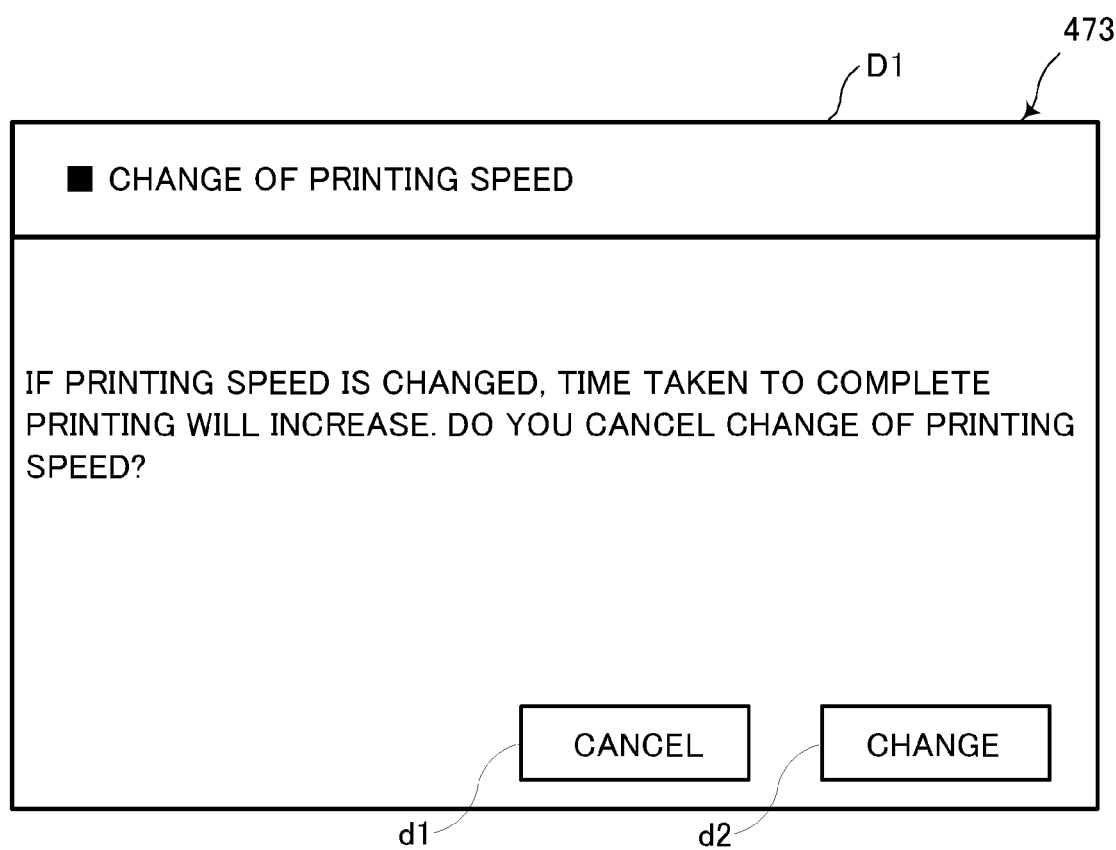
FIG. 5 shows an example of a selection screen displayed on a display section of the image forming apparatus according to the one embodiment of the present disclosure.

If the total amount of time Tb+Tc is equal to or more than the amount of time Ta, i.e., (Tb+Tc)≥Ta (YES in step S13), the display control section 103 allows the display section 473 to display a predetermined selection screen (step S14). FIG. 5 shows an example of the selection screen D1 displayed on the display section 473. In the example shown in FIG. 5, the selection screen D1 serves as a notification screen displaying a notice that if the printing speed is changed, the amount of time taken to complete printing becomes longer than when the printing speed is not changed and a selection screen through which a selection of a determination instruction to determine to allow the printing section to change the printing speed or a cancel instruction to cancel that the printing section changes the printing speed is accepted.

When the acceptance section 102 accepts a cancel instruction to cancel the change of the printing speed (YES in step S15), the operation control section 101 allows the printing section to perform a printing operation without changing the printing speed (step S18). In the example shown in FIG. 5, the acceptance section 102 accepts a press on a button d1 provided on the selection screen D1 as a cancel instruction to cancel the change of the printing speed. Also when in the processing in step S10 no instruction to change the printing speed has been accepted by the acceptance section 102 (NO in step S10), the processing in step S18 is performed.

On the other hand, when the acceptance section 102 accepts a determination instruction to determine the change of the printing speed (NO in step S15), the operation control section 101 performs calibration (step S16). In the example shown in FIG. 5, the acceptance section 102 accepts a press on a button d2 provided on the selection screen D1 as a determination instruction to determine the change of the printing speed.

Furthermore, also when the total amount of time Tb+Tc is neither equal to nor more than the amount of time Ta, i.e., (Tb+Tc)<Ta (NO in step S13), the operation control section 101 performs calibration (step S16).

After the calibration is performed, the operation control section 101 changes the printing speed and allows the printing section to perform a printing operation at the changed printing speed (step S17).

As seen from the above, in the image forming apparatus 1 according to the one embodiment of the present disclosure, it can be avoided that when the printing speed is changed, the amount of time taken to complete printing becomes longer than when the printing speed is not changed.

The present disclosure is not limited to the above embodiment and can be modified in various ways.

<Modification 1>

Figure 6:
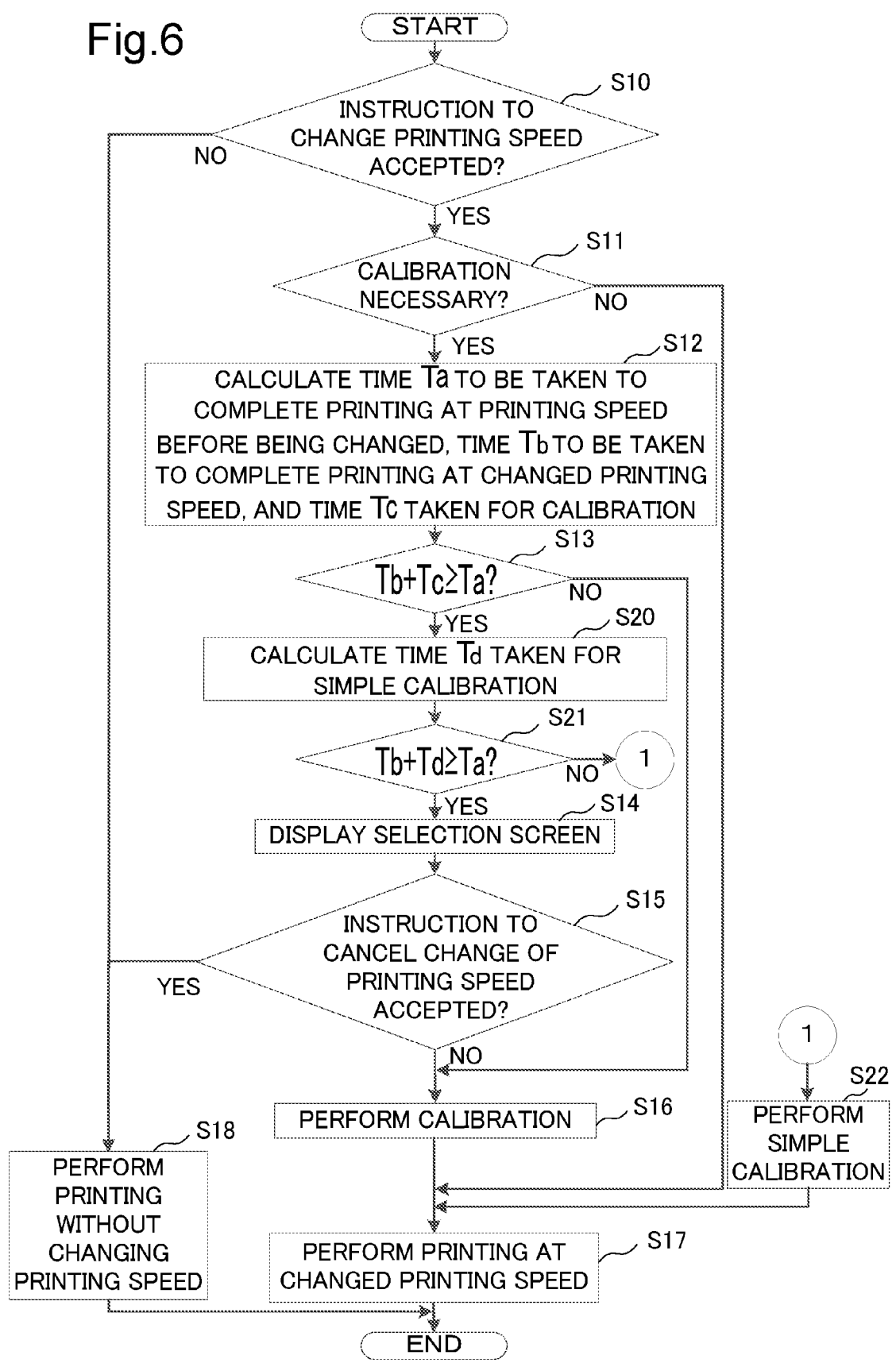
FIG. 6 is a flowchart showing an operation flow of an image forming apparatus according to a modification of the present disclosure.

FIG. 6 is a flowchart showing an operation flow of an image forming apparatus 1 according to Modification 1 of the present disclosure. The same pieces of processing as those in the flowchart shown in FIG. 4 are designated by the same references and further explanation thereof will be omitted.

In the image forming apparatus 1 according to Modification 1, if the total amount of time Tb+Tc is equal to or more than the amount of time Ta (YES in step S13), the operation control section 101 calculates the amount of time Td (fourth amount of time) to be taken for a simple calibration (step S20). The HDD 92 or the like previously stores information indicating the amount of time to be taken for a simple calibration. The operation control section 101 calculates the amount of time Td by retrieving the information.

The simple calibration is a calibration which is intended to ensure a certain degree of printing quality in a short amount of time required and in which part of the process of a normal calibration is simplified or omitted. For example, whereas in the normal calibration a test image is generated by preparing several tens of gradation patches for each of yellow, magenta, cyan, and black, a test image in the simple calibration is generated by preparing a smaller number of gradation patches for each color. Therefore, the amount of time required for the simple calibration is shorter than that for the normal calibration.

After the amount of time Td is calculated, the operation control section 101 compares the total amount of time Tb+Td of the amount of time Tb and the amount of time Td with the amount of time Ta (step S21). If the total amount of time Tb+Td is neither equal to nor more than the amount of time Ta, i.e., (Tb+Td)<Ta (NO in step S21), the operation control section 101 performs the simple calibration (step S22). Then, after the end of the simple calibration, the operation control section 101 changes the printing speed and allows the printing section to perform a printing operation at the changed printing speed (step S17). On the other hand, if the total amount of time Tb+Td is equal to or more than the amount of time Ta, i.e., (Tb+Td)≥Ta (YES in step S21), the processing in step S14 is performed.

As seen from the above, in the image forming apparatus 1 according to Modification 1, even in the case where if a normal calibration were performed in changing the printing speed, the amount of time taken to complete printing would be longer than when the printing speed was not changed, the amount of time taken to complete printing when the printing speed is changed can be made shorter than when the printing speed is not changed, by performing, not the normal calibration, but the simple calibration.

In the case where the operation control section 101 performs the simple calibration, the display control section 103 may allow the display section 473 to display a notification screen giving a notice that the printing quality is likely to be degraded.

<Modification 2>

If in the flowchart shown in FIG. 4 the total amount of time Tb+Tc is equal to or more than the amount of time Ta (YES in step S13), the processing in step S14 and the processing in step S15 may be omitted and the processing in step S18 may be performed. In this respect, if the total amount of time Tb+Tc is equal to or more than the amount of time Ta, the operation control section 101 determines not to allow the printing section to change the printing speed and allows the printing section to perform a printing operation at the printing speed before being changed. On the other hand, if the total amount of time Tb+Tc is neither equal to nor more than the amount of time Ta, the operation control section 101 determines to allow the printing section to change the printing speed and allows the printing section to perform a printing operation at a printing speed indicated in an instruction to change the printing speed accepted by the acceptance section.

<Modification 3>

The display control section 103 may allow the display section 473 to provide, on the selection screen displayed in the processing in step S14 of the flowchart shown in FIG. 4, a display for accepting a calibration omission instruction to omit calibration and allow the printing section to change the printing speed.

When the acceptance section 102 accepts the calibration omission instruction on the selection screen, the operation control section 101 determines to allow the printing section to change the printing speed, omits calibration, and allows the printing section to perform a printing operation at a printing speed indicated in an instruction to change the printing speed accepted by the acceptance section.

In the case where the operation control section 101 omits calibration, the display control section 103 may allow the display section 473 to display a notification screen giving a notice that the printing quality is likely to be degraded.

<Other Modifications>

The image forming apparatus control program described in the above embodiment and modifications may be one stored on a computer-readable non-transitory recording medium, such as a hard disk, a CD-ROM, a DVD-ROM, a semiconductor memory or so on.

Some of the configurations shown in the above embodiment and modifications may be combined.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a printing section; and
a control unit, wherein the control unit implements:
an acceptance section configured to accept an instruction for the printing section to change a printing speed; and
an operation control section configured to control an operation of the printing section, wherein when the acceptance section accepts the instruction to change the printing speed, the operation control section calculates a first amount of time to be taken from when the printing section starts printing at a printing speed before being changed until the printing section completes the printing, a second amount of time to be taken from when the printing section starts the printing at a changed printing speed until the printing section completes the printing, and a third amount of time to be taken for the printing section to change the printing speed and start the printing at the changed printing speed, compares a total amount of time of the second and third amounts of time with the first amount of time, and determines whether to allow the printing section to change the printing speed based on a result of the comparison,
wherein the printing section selectively changes the printing speed based on the determination.

2. The image forming apparatus according to claim 1, wherein
when the total amount of time is equal to or more than the first amount of time, the operation control section determines not to allow the printing section to change the printing speed and allows the printing section to perform the printing operation at the printing speed before being changed, and
when the total amount of time is neither equal to nor more than the first amount of time, the operation control section determines to allow the printing section to change the printing speed and allows the printing section to perform the printing operation at the printing speed indicated in the instruction to change the printing speed accepted by the acceptance section.

3. The image forming apparatus according to claim 1, wherein the operation control section calculates, as the third amount of time, an amount of time to be taken for a first calibration necessary for the printing section to change the printing speed and perform the printing operation at the changed printing speed.

4. The image forming apparatus according to claim 3, wherein
the image forming apparatus is capable of performing a second calibration, in which part of a process of the first calibration is simplified or omitted and a shorter amount of time is required than the first calibration, and
the operation control section is further configured to calculate an amount of time to be taken for the second calibration as a fourth amount of time, wherein when the total amount of time is equal to or more than the first amount of time and a total amount of time of the second amount of time and the fourth amount of time is neither equal to nor more than the first amount of time, the operation control section determines to allow the printing section to change the printing speed, performs the second calibration, and then allows the printing section to perform the printing operation at the printing speed indicated in the instruction to change the printing speed accepted by the acceptance section.

5. The image forming apparatus according to claim 4, wherein when the total amount of time of the second amount of time and the fourth amount of time is equal to or more than the first amount of time, the operation control section determines not to allow the printing section to change the printing speed.

6. The image forming apparatus according to claim 1, wherein the operation control section is further configured to calculate each of the first amount of time and the second amount of time by multiplying a number of recording paper sheets subject to printing indicated in a print job accepted by the acceptance section by a sum of a dimension of the recording paper sheet in a direction of conveyance thereof and a distance between the recording paper sheets and dividing a value obtained by the multiplication by the printing speed.

7. The image forming apparatus according to claim 1, further comprising a display section,
wherein the control unit further implements a display control section configured to control display of the display section,
when the total amount of time is equal to or more than the first amount of time, the display control section allows the display section to display a notification screen giving a notice that if the printing speed is changed, the amount of time taken to complete printing becomes longer than when the printing speed is not changed and a selection screen through which a selection of a determination instruction to determine to allow the printing section to change the printing speed or a cancel instruction to cancel that the printing section changes the printing speed is accepted,
when the acceptance section accepts the cancel instruction, the operation control section determines not to allow the printing section to change the printing speed and allows the printing section to perform the printing operation at the printing speed before being changed, and
when the acceptance section accepts the determination instruction or when the total amount of time is neither equal to nor more than the first amount of time, the operation control section determines to allow the printing section to change the printing speed and allows the printing section to perform the printing operation at the printing speed indicated in the instruction to change the printing speed accepted by the acceptance section.

8. The image forming apparatus according to claim 7, wherein
the operation control section calculates, as the third amount of time, an amount of time to be taken for a first calibration necessary for the printing section to change the printing speed,
the display control section allows the display section to provide, on the selection screen, a display for accepting the first calibration omission instruction to omit the first calibration and allow the printing section to change the printing speed, and when the acceptance section accepts the first calibration omission instruction, the operation control section determines to allow the printing section to change the printing speed, omits the first calibration, and allows the printing section to perform the printing operation at the printing speed indicated in the instruction to change the printing speed accepted by the acceptance section.

9. The image forming apparatus according to claim 8, wherein while the display control section allows the display section to provide the display for accepting the calibration omission instruction, the display control section allows the display section to provide a display giving a notice that there is a possibility of a printing quality being degraded.

10. The image forming apparatus according to claim 1, wherein the operation control section is configured to change the printing speed by allowing the printing section to change a processing speed in the printing operation.

11. The image forming apparatus according to claim 1, wherein the operation control section is configured to change the printing speed by allowing the printing section to change an interval between the recording paper sheets being fed in a continuous printing operation.

\* \* \* \* \*